United States Patent
Puppa et al.

(10) Patent No.: US 7,778,163 B2
(45) Date of Patent: *Aug. 17, 2010

(54) SYSTEM AND METHOD FOR DETECTING FAILURES AND RE-ROUTING CONNECTIONS IN A COMMUNICATION NETWORK

(75) Inventors: Gary J. Puppa, Orleans (CA); Ken Dubuc, Ottawa (CA); David J. Maxwell, Ottawa (CA); Robin Jeffrey Park, Kanata (CA)

(73) Assignee: Alcatel Lucent, Paris (FR)

( * ) Notice: Subject to any disclaimer, the term of this patent is extended or adjusted under 35 U.S.C. 154(b) by 379 days.

This patent is subject to a terminal disclaimer.

(21) Appl. No.: 11/635,534

(22) Filed: Dec. 8, 2006

(65) Prior Publication Data

US 2007/0081465 A1  Apr. 12, 2007

Related U.S. Application Data

(63) Continuation of application No. 10/015,573, filed on Dec. 17, 2001, now Pat. No. 7,164,652.

(51) Int. Cl.
*G01R 31/08* (2006.01)
(52) U.S. Cl. .................. 370/225; 370/236.2
(58) Field of Classification Search ........... 370/217, 370/218, 221, 225, 228, 235, 236, 236.2, 370/466
See application file for complete search history.

(56) References Cited

U.S. PATENT DOCUMENTS

| | | | | |
|---|---|---|---|---|
| 5,627,822 A | * | 5/1997 | Edmaier et al. | 370/218 |
| 6,011,780 A | * | 1/2000 | Vaman et al. | 370/237 |
| 6,097,932 A | | 8/2000 | Kudoh | |
| 6,775,239 B1 | * | 8/2004 | Akita et al. | 370/248 |
| 7,002,906 B1 | * | 2/2006 | Basso et al. | 370/218 |
| 7,164,652 B2 | * | 1/2007 | Puppa et al. | 370/225 |

(Continued)

FOREIGN PATENT DOCUMENTS

CN  1193246  9/1998

(Continued)

OTHER PUBLICATIONS

Nippon Electric Co., English Abstract for CN 1193246 Application, Sep. 16, 1998, 1 Page.

(Continued)

*Primary Examiner*—Ricky Ngo
*Assistant Examiner*—Christine Ng
(74) *Attorney, Agent, or Firm*—Kramer & Amado P.C.

(57) ABSTRACT

A method of re-establishing a connection for a communication link is provided. The link has first and second portions, having the first portion in a first communication network, the second in a second communication network and an interface connecting first portion to the portion. The first communication network has a first communication protocol and a first OAM protocol to monitor integrity of the first portion. Similarly, the second communication network has a second communication protocol and a second OAM protocol. The method utilizes the second OAM protocol to detect a failure in the second portion. Upon detection of the failure, an alternate route for the second portion in the second communication network is identified, where the alternate route is able to complete the second portion of the communication link from the interface. For the communication link, at the interface the second portion is replaced with the alternate route.

24 Claims, 8 Drawing Sheets

U.S. PATENT DOCUMENTS

| | | | |
|---|---|---|---|
| 7,289,428 B2* | 10/2007 | Chow et al. | 370/216 |
| 2002/0112072 A1* | 8/2002 | Jain | 709/239 |
| 2004/0202112 A1* | 10/2004 | McAllister et al. | 370/252 |

OTHER PUBLICATIONS

MPLS Document in Chinese, Apr. 2001, 3 Pages.

"MPLS Wide-Band Network Interconnection Technique", English Abstract for "MPLS Document in Chinese", Apr. 2001, 1 Page.

The ATM Forum Technical Committee, "ATM-MPLS Network Interworking, Version 1.0, AF-AIC-0178.000", Aug. 2001, 23 Pages.

Alcatel, "ATM in the Next Generation Network—ATM-MPLS Mediation", Alcatel Technical White Paper, Aug. 31, 2001, pp. 1-16.

Hagard et al, "Multiprotocol Label Switching in ATM Networks", Ericsson Review, No. 1, Jan. 1, 1998, pp. 32-39.

* cited by examiner

SYSTEM AND METHOD FOR DETECTING FAILURES AND RE-ROUTING CONNECTIONS IN A COMMUNICATION NETWORK

This application is a continuation of U.S. patent application Ser. No. 10/015,573, filed Dec. 17, 2001 now U.S. Pat. No. 7,164,652, and incorporated herein by reference.

FIELD OF ART

The invention relates to digital communication systems and more specifically to an implementation of a network node capable of providing asynchronous transfer mode (ATM) traffic to multi-protocol label switching (MPLS) platform.

BACKGROUND OF INVENTION

MPLS is quickly gaining support in the communication industry as a high-speed core of many communication networks. Networks are being developed and deployed which interface ATM networks with MPLS networks.

There is a need for a system which can utilize aspects of MPLS OAM in an ATM network, when an MPLS network is used as part of the ATM network.

SUMMARY OF INVENTION

In a first aspect, a method of re-establishing a connection for a communication link is provided. The communication link has a first portion in a first communication network, a second portion in a second communication network and an interface connecting the first portion to the portion. The first communication network has a first communication protocol and a first OAM protocol adapted to monitor integrity of the first portion; the second communication network has a second communication protocol and a second OAM protocol adapted to monitor integrity of the second portion. The method utilizes the second OAM protocol to detect a failure in the second portion. Upon detection of the failure, the method identifies an alternate route for the second portion in the second communication network, the alternate route being able to complete the second portion of the communication link from the interface. For the communication link, at the interface the method replaces the second portion with the alternate route.

The method may have the first communication network as an ATM network, the first OAM protocol as one of PNNI and ATM OAM, the second communication network as a MPLS network and the second OAM protocol as MPLS OAM.

The method may perform identification of an alternate route for the second portion in the second communication network at the interface.

The method may utilize the second OAM protocol to detect a failure in the second portion by monitoring the second portion for receipt of frames containing MPLS OAM information and debouncing the frames.

The method may identify an alternate route for the second portion in the second communication network by maintaining and accessing a list of alternate routes for the second portion is maintained to identify the alternate route.

The method may have the first OAM protocol adapted to detect failures in the second portion.

The method may utilize the second OAM protocol to detect clearance of the failure in the second portion. Upon detection of the clearance of the failure, for the communication link, the method replaces the alternate route with the second portion at the interface.

In a second aspect, a network node is provided. The node is associated with a first communication network and a second communication network. The node processes communications for a communication link. The communication link has a first portion in the first communication network, a second portion in the second communication network and an interface between the first portion and the second portion at the network node. The first communication network has a first communication protocol and a first OAM protocol adapted to monitor integrity of the first portion; the second communication network has a second communication protocol and a second OAM protocol adapted to monitor integrity of the second portion. The node has a first module adapted to detect a failure in the second portion utilizing the second OAM protocol, a second module adapted to receive an indication of the failure and upon receipt of the indication, to identify an alternate route for the second portion in the second communication network, the alternate route being able to complete the second portion of the communication link from the interface and a third module adapted to receive an indication of the alternate route and to replace the second portion with the alternate route for the communication link.

The node may have the first communication network as an ATM network, the first OAM protocol as one of PNNI and ATM OAM, the second communication network as a MPLS network and the second OAM protocol as MPLS OAM.

The node may have the first module utilizing the second OAM protocol to detect the failure in the second portion by monitoring the second portion for receipt of frames containing MPLS OAM information and the first module debouncing the frames.

The node may have the second module further comprising a list of alternate routes for the second portion to identify the alternate route.

The node may have the first module adapted to use the second OAM protocol to detect clearance of the failure in the second portion and the third module adapted to replace the alternate route with the second portion for the communication link upon detection of the clearance of the failure.

In other aspects, the invention provides various combinations and subsets of the aspects described above.

BRIEF DESCRIPTION OF DRAWINGS

The foregoing and other aspects of the invention will become more apparent from the following description of specific embodiments thereof and the accompanying drawings which illustrate, by way of example only, the principles of the invention. In the drawings, where like elements feature like reference numerals which may bear unique alphabetical suffixes in order to identify specific instantiations of like elements).

DETAILED DESCRIPTION OF EMBODIMENTS

Figure 1:
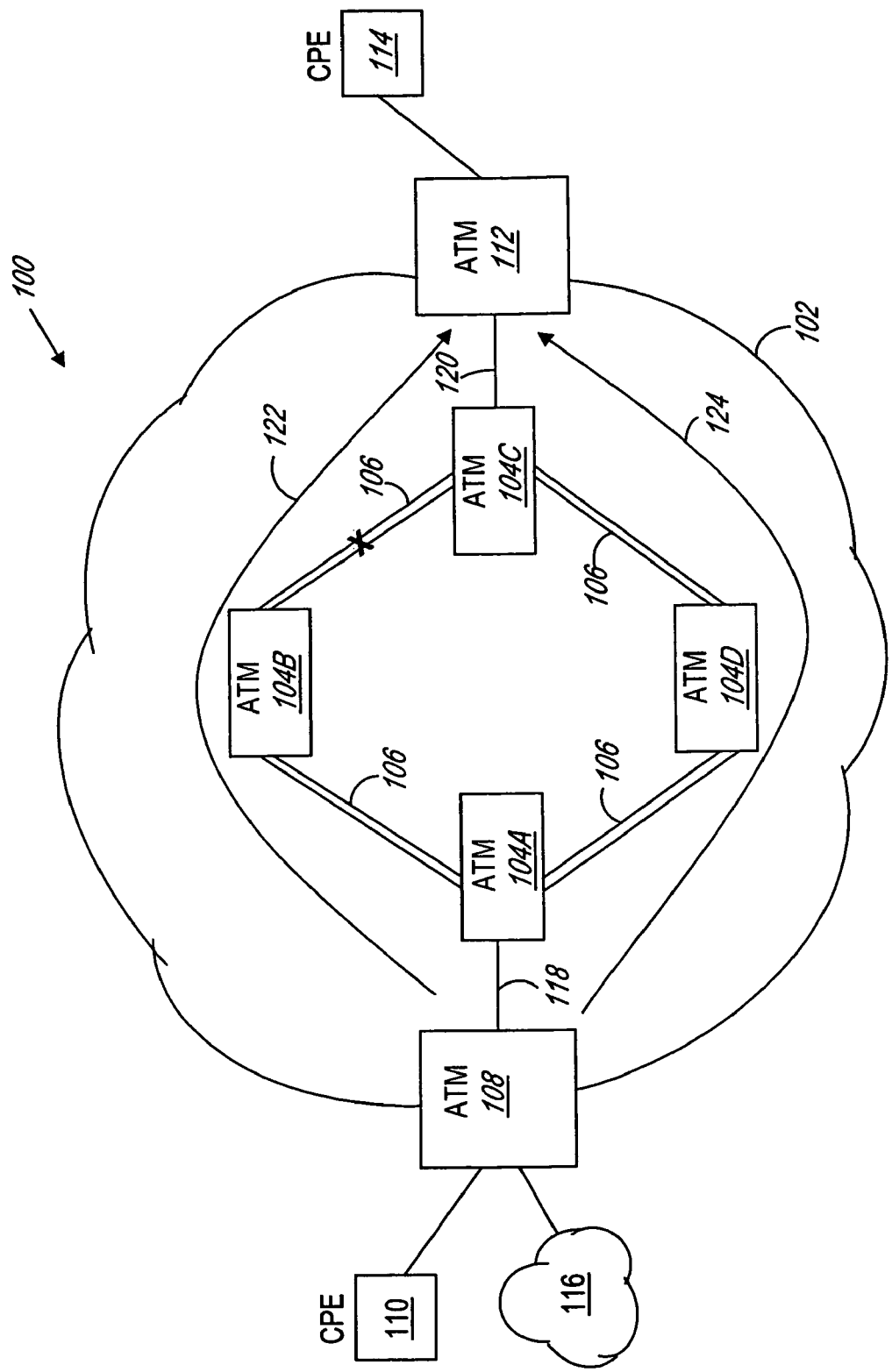
FIG. 1 is a block diagram of a prior art ATM communication network known in the art with a failed link between two nodes therein.

The description which follows, and the embodiments therein, are provided by way of illustrating an example, or examples, of particular embodiments of principles of the present invention. These examples are provided for the purpose of explanation, and not limitations, of those principles. In the description, which follows, like elements are marked throughout the specification and the drawings with the same respective reference numerals.

Referring to FIG. 1, prior art system 100 is shown, comprising an ATM network whose general configuration is known in the art. Therein, network 102 comprises an interconnected number ATM switches 104 connected by communication links 106 which can each carry ATM traffic thereon. At the edge of network 102, ATM edge switch 108 provides a connection for Customer Premise Equipment (CPE) 110 to network 102. Similarly, at another edge of network 102, ATM edge switch 112 provides a link for CPE 114 to network cloud 102. It will be appreciated that ATM edge switch 108 may also have a connection to another ATM network 116. ATM edge switch 108 is connected to elements in network 102 via link 118. Similarly, ATM edge switch 112 is connected to elements in network 102 via link 120.

ATM edges switches have the ability to detect and reroute around failures in network cloud 102, using known PNNI signalling or ATM OAM protocols. When exemplary communications are sent from CPE 110 to CPE 114 a PNNI signalling link first is established from ATM edge switch 108 to ATM edge switch 112 through ATM switches 104. For example, initially, routing path 122 traversing ATM switches 104A, 104B and 104C is established. When the path 122 is available and a failure of an element of an element therein occurs, for example, a failure in link 106 connecting ATM switch 104B to ATM switch 104C, PNNI can be used to re-establish a connection along an alternate path.

Meanwhile, the embodiment provides a system and method for a node having a connection to an ATM network and a connection to a MPLS network to detect and reroute around failures in established paths detected in the MPLS network utilizing MPLS OAM. Further detail on the embodiment utilizing a MPLS network is provided.

Figure 2:
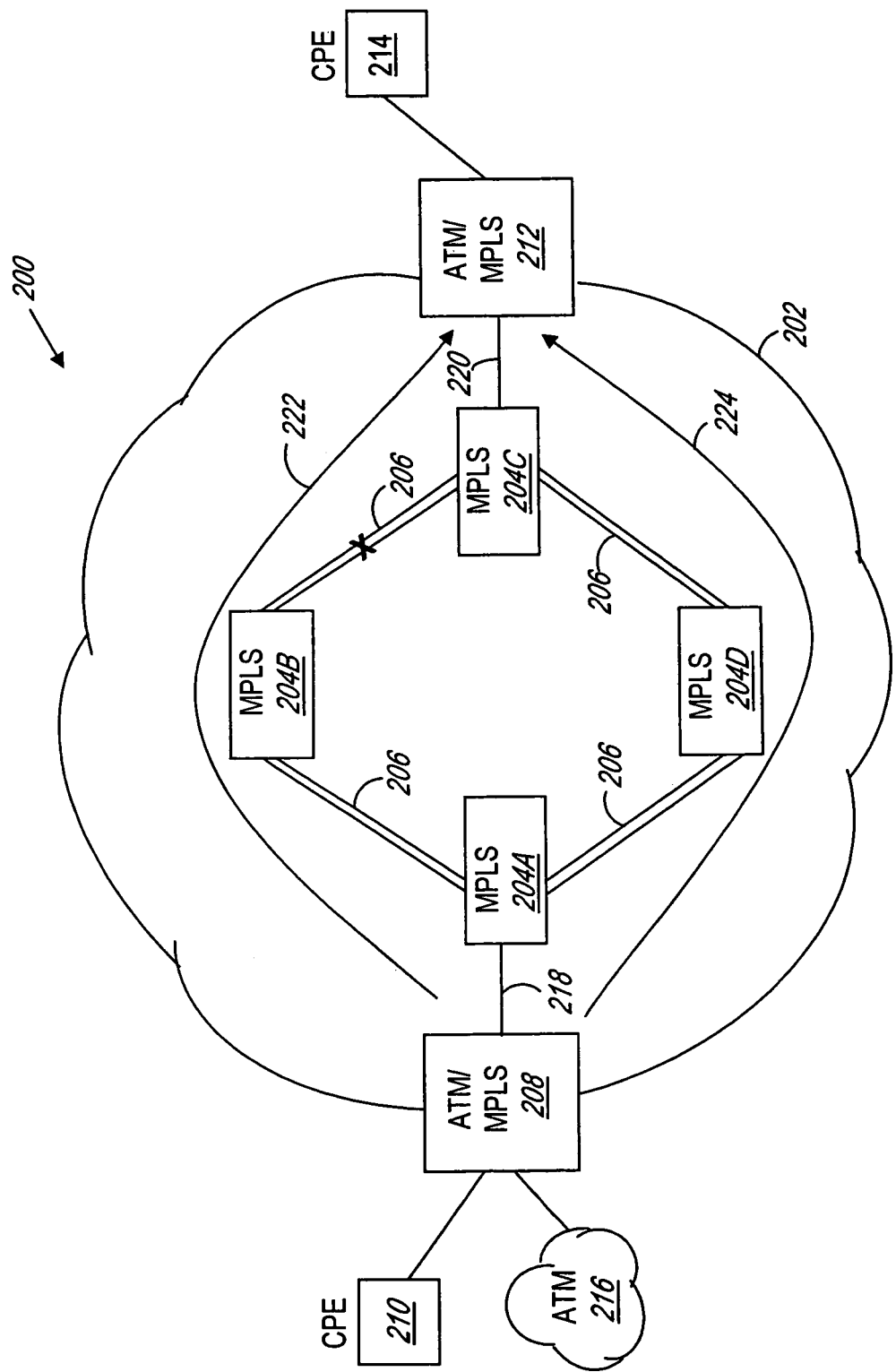
FIG. 2 is a block diagram of an ATM network incorporating therein a MPLS network according to an embodiment of the invention with a failed tunnel link between two MPLS nodes in the MPLS network.

Referring to FIG. 2, system 200 is shown which includes a switch incorporating an embodiment. Therein, MPLS network 202 comprises MPLS switches 204 which are linked via communication links 206. At one edge of network 202, ATM/MPLS switch 208 provides and interface for ATM devices such as CPE 210 to network 202. At another edge of network 202, ATM/MPLS switch 212 provides an interface point for an ATM device such as CPE 214. ATM/MPLS switch 208 has a link to another ATM network 216. ATM/MPLS switch 208 communicates with MPLS switches in network 202 via communication link 218. Similarly, ATM/MPLS switch 212 communicates with MPLS switch 204C via communication link 220. It will be appreciated that network 202 may have other connections to other networks.

In order to provide quality of service (QoS) standards, for example like those in an ATM network, for communications processed through MPLS network 202, the MPLS switches 208 utilize MPLS signalling to establish dedicated and preset routing paths for traffic carried within MPLS network 202. The routing paths are known to all elements in network 202. For example, if CPE 210 is in communications with CPE 214, after data is transmitted from CPE 210 to ATM/MPLS switch 208, the data is sent through MPLS network 202 using Label Switched Path ("LSP") 222 between ATM/MPLS switch 208 and ATM/MPLS switch 212. At switch 212, the data is forwarded to CPE 214. LSP 222 can also carry data from switch 212 to switch 208. A LSP may also be referred to as a routing path.

Another requirement for QoS standards mandates that redundant MPLS routing paths must be provided. In the event of a failure of a component in MPLS routing path 222, for example, a failure in communication link 206 connecting MPLS switch 204B to MPLS switch 204C, the failure has to be detected and traffic has to be rerouted to an alternate MPLS routing path, such as alternate MPLS routing path 224. Further detail on the mechanism for monitoring and routing MPLS routing paths is provided below.

Accordingly, switch 208 is an embodiment providing a handshaking point between ATM and MPLS networks allowing routing information from each type of network to be provided and used by the other network in maintaining communication links. It will appreciated that switch 208 may also be referred to as a node, network element, routing switch or other terms known in the art.

Figure 3:
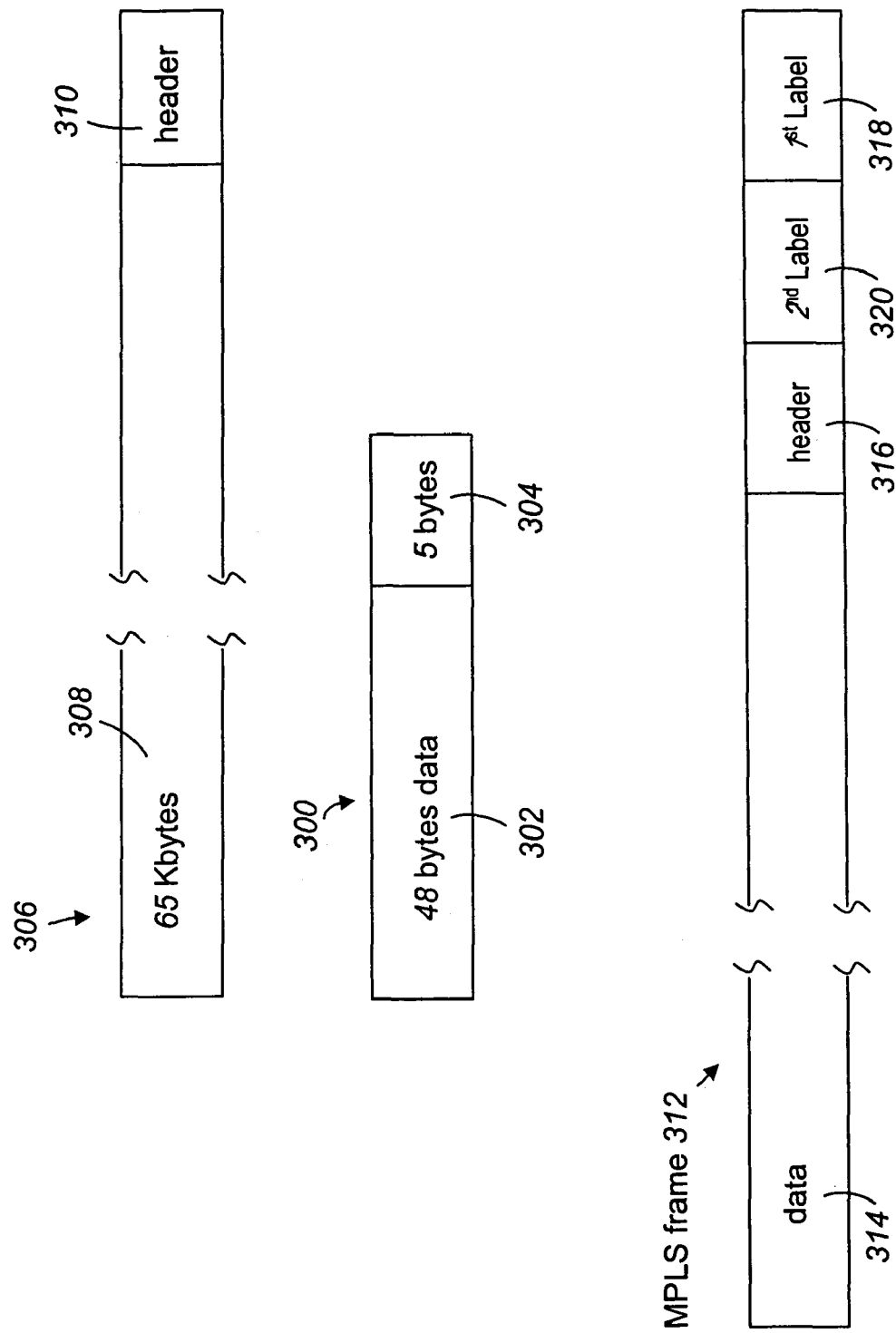
FIG. 3 is a block diagram of two ATM cells and an equivalent MPLS frame which are utilized by a node in FIG. 2 which embodies the invention.

Referring to FIG. 3, aspects of the conversion of ATM cells received from CPE 210 by ATM/MPLS switch 208 to MPLS frames, and vice versa are shown. It will be appreciated that, as ATM/MPLS switch 208 is notionally at edge of an ATM network and an MPLS network, ATM/MPLS switch 208 must translate ATM cells to MPLS frames and vice versa. ATM data is either encapsulated into cells or frames. Exemplary ATM cell 300 comprises 48 bytes of data in data field 302 and five bytes of header data in header field 304. The header field includes data relating to error checking destination information. Frequently, ATM cells 300 are used to encode voice calls in AAL 1/2/5 signalling parameters. ATM frames are used to transmit larger amounts of data. Exemplary ATM frame 306 comprises data field 308 which may have 65 Kbytes of data. Header field 312 is comparable to header field 304 for ATM cell 304. MPLS frame comprises data field 314, header field 316, first label field 318 and second label field 320.

When converting an ATM cell or frame to an MPLS frame, the respective ATM data field (either data field 302 or 308) is inserted into MPLS data field 314. Similarly, the contents of the respective ATM cell or frame header fields (either header field 304 or header field 310) is inserted into MPLS header field 316. First label field 318 and second label field 320 are used to identify the routing information for MPLS frame 312 through MPLS network 202. First label field 318 contains identification information relating to the MPLS routing path for the MPLS frame. For example this first label field 318 may contain information relating to the routing path relating to MPLS routing path 222. Second label field 320 contains connection information relating to the particular internal ATM connection which may be used by nodes 208 and 212 for routing the ATM path. As the tunnels are known, each node in network 202 can examine the contents of first label field 318 and direct the frame to the appropriate node in the network 202.

Figure 4:
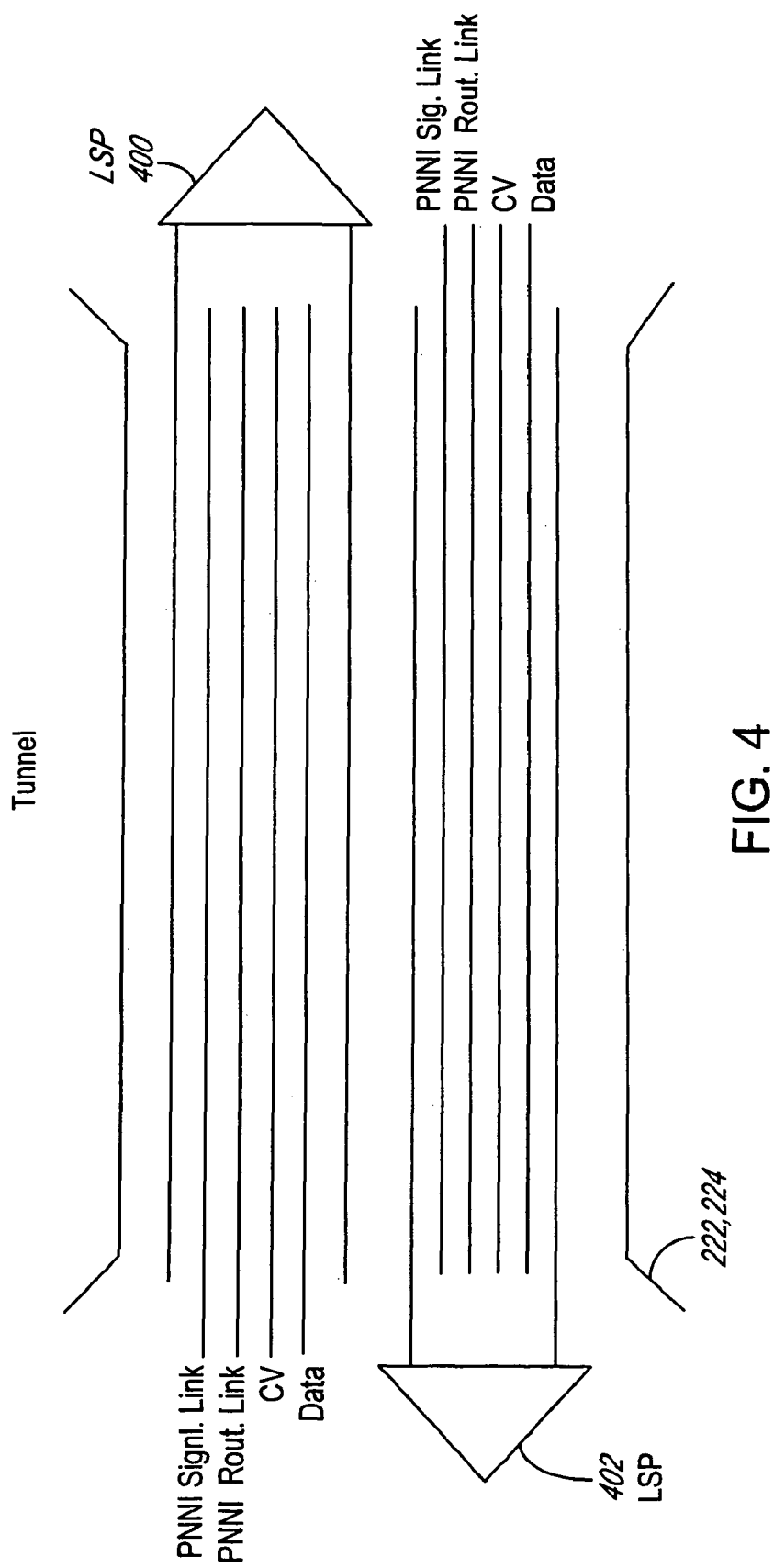
FIG. 4 is a block diagram of a tunnel link connecting two MPLS nodes in the MPLS network of FIG. 2.
Figure 5:
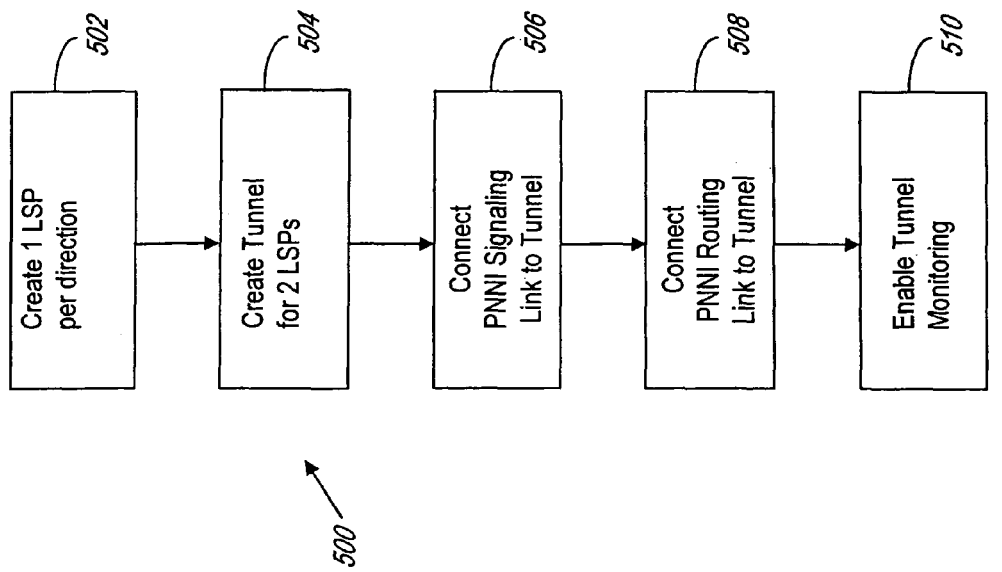
FIG. 5 is a flow chart of an algorithm used to establish the tunnel link of FIG. 3.

Referring to FIGS. 4 and 5, a description of the establishment and contents of MPLS routing paths 206, 218 and 220 is provided. In the embodiment, MPLS routing paths 206, 220 and 218 are physically embodied in separate fibre optic cables each carrying uni-directional data either to or from an MPLS switch 204 or ATM/MPLS switch 208. Using the example of MPLS routing path 218, downstream communications from ATM/MPLS switch 208 to MPLS switch 204A are carried on a separate fibre connection identified as label switched path (LSP) 400. Similarly, communications carried from MPLS switch 204A to ATM/MPLS switch 208 are carried LSP 402. It will be appreciated that LSP 400 and LSP 402 may be connected to the same physical port on switch 208 which may be collectively grouped into an MPLS tunnel constituting MPLS routing path 218. It will be appreciated that the term "tunnel" is interchangeable with the term "MPLS routing path". A PNNI trunk group is created to associate LSP 400 with LSP 402. The PNNI trunk group may be one of many trunk groups associated with a physical port on switch 208 that interfaces to MPLS network 202. The trunk group also allows connection admission control (CAC) and ATM signalling of ATM connections over the tunnel using PNNI signalling protocols.

Referring to FIG. 5, algorithm 500 is shown which is used establish, configure and monitor a tunnel, such as MPLS routing paths 222 and 224. First, at step 502, one LSP is created per direction between the source and destination MPLS switch nodes. In the embodiment, the source MPLS node may be ATM/MPLS switch 208 and the destination MPLS switch may be ATM/MPLS switch 212. Next at step 504, the two respective LSPs are combined to create a tunnel. For the network shown in FIG. 2, the tunnel may be MPLS routing path 222. Next at step 506, the PNNI signalling link associated with the ATM data is connected to the tunnel. Next at step 508, the PNNI routing link associated with the ATM data is connected to the tunnel. Finally, at step 510, tunnel monitoring is enabled. At this point, tunnel 222 provides a communication link between ATM/MPLS edge switch 208 to ATM/MPLS switch 212. The PNNI signalling and routing links in the tunnel enable the embodiment to use PNNI signalling protocols to detect and react to any signalling failures in tunnel 222. However, as described below, the embodiment utilizes MPLS OAM signalling protocols instead of PNNI protocols as MPLS signalling protocols provide improved response times.

It will be appreciated that for alternate tunnel 224, algorithm 500 may be repeated to establish an alternate routing path for ATM/MPLS switch 208 to ATM/MPLS switch 212.

Referring to FIG. 4, LSP 400 and 402 may each carry PNNI signalling link packets, PNNI routing link data packets and specialized MPLS operation, administration and maintenance (OAM) frames. The MPLS OAM frames follow ITU Y.17 MPLS standards, which are incorporated herein by reference. There are three types of MPLS OAM frames used by the embodiment:
 1) Connectivity verification (CV) frames;
 2) Backward defect indicator (BDI) frames; and
 3) Forward defect indicator (FDI) frames.

The type of MPLS OAM frame sent within an LSP is identified via the header information and the second label field 320 in an MPLS frame. The first label field 318 contains the tunnel identification information related to the OAM destination. Presently, in the embodiment, a MPLS OAM frame is identified with a value defined by the MPLS standards bodies. Currently, the value is "5". This value is placed in second label field 320. The contents of the data field identify the type of MPLS OAM frame.

Figure 6:
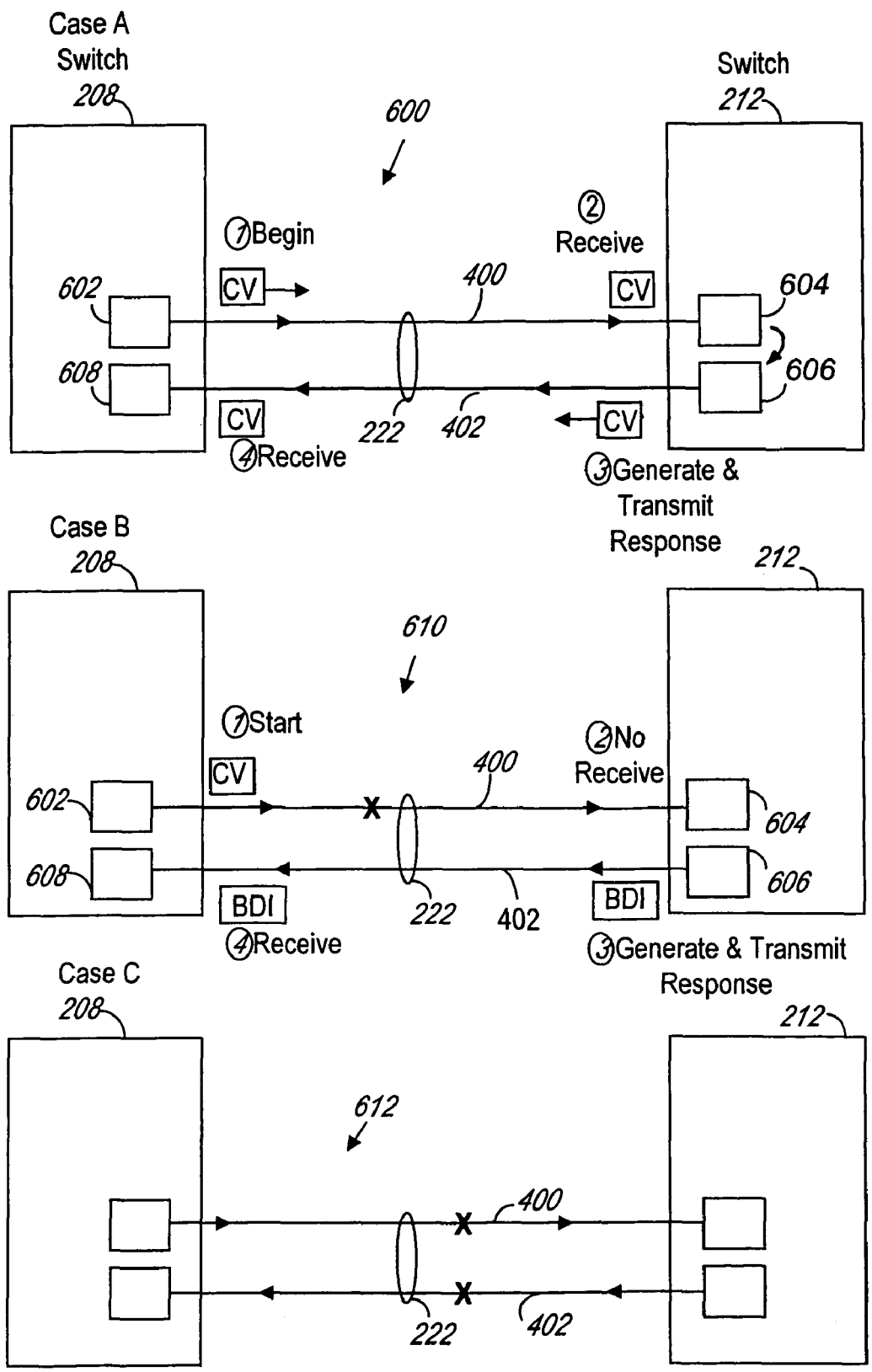
FIG. 6 is a diagram of various cases of OAM frames sent and monitored associated with the tunnel link of FIG. 4.

Referring to FIG. 6, a description of the ITU Y.17 OAM signalling protocol used in the embodiment is provided by referring to tunnel 222 between ATM/MPLS switch 208 and ATM/MPLS switch 212. The OAM signalling protocol generally operates as follows: at an upstream switch, an OAM frame is generated and is transmitted in its associated LSP to a downstream switch. At the downstream switch the OAM frame is received and is analysed. Depending on the results of the analysis, the downstream switch generates a response OAM frame which is transmitted upstream to the originating switch along its associated LSP. At the originating switch, the response OAM frame is received and analysed. Depending on the state of either LSP or either switch, the ultimate response message will indicate to the originating switch the status of the entire tunnel.

There are four signalling OAM cases generated depending on the status of LSP 400, LSP 402, switch 212 and downstream components beyond switch 212. To illustrate these signalling aspects in the embodiment, upstream switch is ATM/MPLS switch 208, downstream switch is ATM/MPLS switch 212, the originating frame module is transmit module 602, the receiving module is monitoring module 604, the reply transmit module is module 606 and the receiving reply module is monitoring module 608.

Case A at 600 illustrates a tunnel 222 with no transmission problems in the noted elements. At switch 208, at step one, transmit modules 602 generates a CV frame and transmits it on LSP 400. At switch 212 at step two, the CV frame is received by the monitoring module 604. At step three, the monitoring module acknowledges receipt of the CV frame. At step four, the response CV frame is received at switch 208 at module 608. Switch 208 can determine that tunnel 222 is fully operational by the receipt of the response CV frame. CV frames are generated by CV transmit module 602 and module 608 every one second according to ITU Y.17 standards. Accordingly, after a certain transmission and frame processing delay, when tunnel 222 and its downstream components which affect tunnel 222 are fully operational, the response CV frames received by 208 should arrive approximately once every second. It will be appreciated that other time intervals could be used for transmitting CV frames.

In Case B at 610, it is presumed that there is a failure in LSP 400. At step one, CV transmitter module 602 generates and transmits its CV frame onto LSP 400. At step two, it will not be received by monitor 604 at switch 212 due to the failure in LSP 400. Accordingly at step three, CV response transmitter generates a response BDI frame which indicates that a failure has occurred in the transmission link backward of switch 212 as switch 212 did not receive the CV frame. The BDI frame is transmitted on LDP 402 and at step four it is received at switch 208 by CV/BDI/FDI monitor module 608. Switch 208 then can determine that the tunnel 222 is not fully operational and can cause a traffic switch to an alternate tunnel.

In Case C at 612 it is presumed that there is a failure in both LDP 400 and LDP 402. Accordingly, as with Case B, steps one, two and three are identical. However, at step four switch 208 will not receive the BDI frame. Accordingly, switch 208 will recognize the absence of a response to the originally transmitted CV frame and will, again, switch from the currently active tunnel 222 to an alternate tunnel.

Case D (not shown in FIG. 6) is a variation Case A. In a normal situation if tunnel 222 is fully operational, switch 208 and switch 212 will be able to transmit and receive CV frames therebetween. However, if switch 212 has an indication that downstream to it, there is a further failure which affects tunnel 222, CV/BDI/FDI response module 606 generates a FDI frame, which indicates that downstream of switch 212 there is a forward integrity problem associated with tunnel 222. The FDI frame is transmitted from switch 212 to switch 208 via LDP 402. The FDI frame is received by CV/BDI/FDI frame monitor 608. Switch 208 can then recognize the fault downstream of tunnel 222 and can switch to an alternate tunnel as necessary.

Additionally, a signal debounce mechanism is provided. As discussed earlier, switch 208 generates and inserts CV frames at one second intervals. In the embodiment, a failure is noted by any receiving module only after three consecutive frames either are not received or indicate that there is a problem with the link (either through a BDI or FDI indication) to eliminate spurious error signals.

Figure 7:
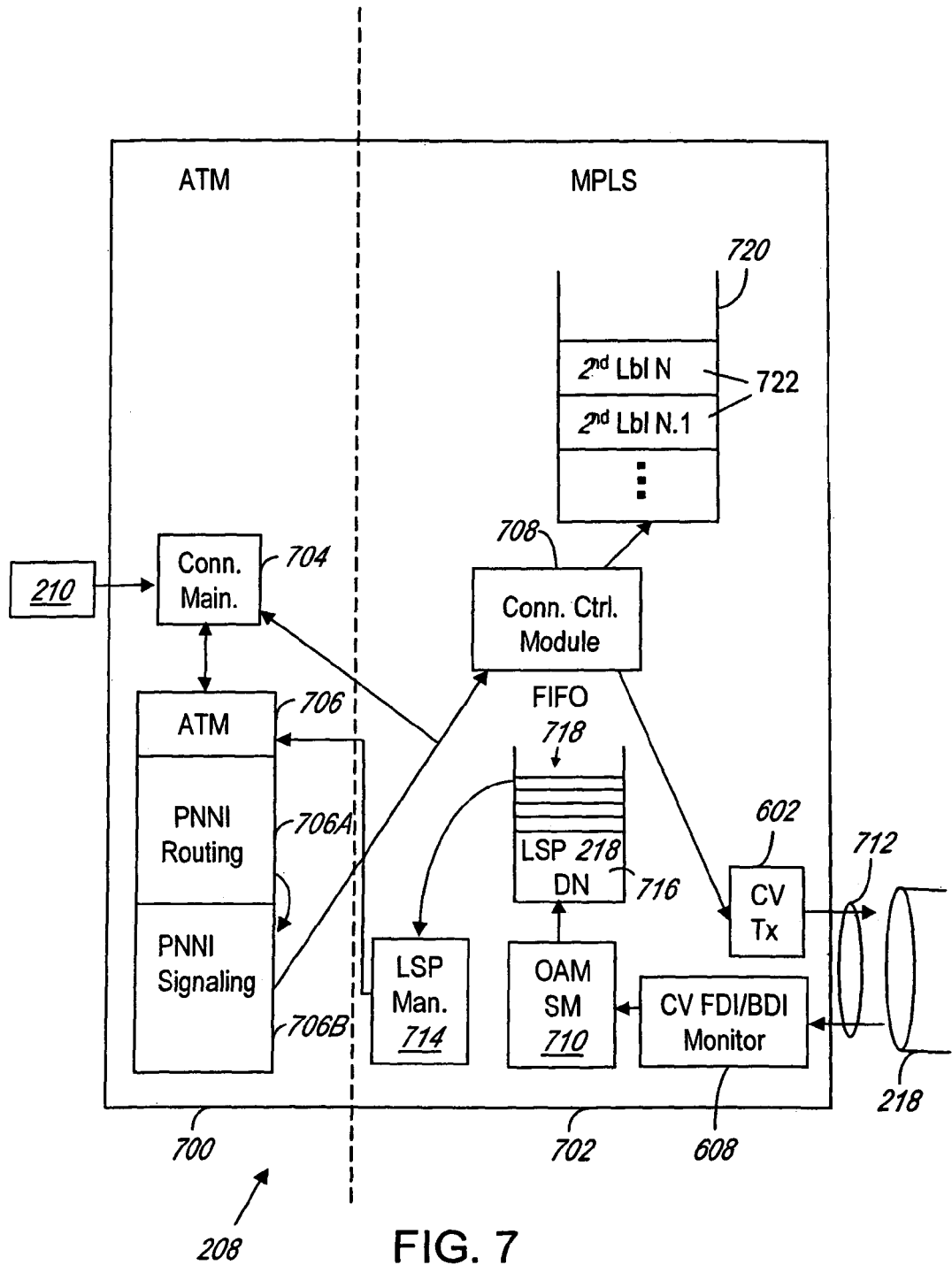
FIG. 7 is a block diagram of elements of a node embodying the invention interfacing the ATM network with the MPLS network of FIG. 2.

Referring to FIG. 7, details of switch 208 illustrating handshaking between MPLS OAM modules and PNNI signalling modules are provided. Switch 208 comprises ATM processing section 700 and MPLS processing section 702. ATM section 700 comprises connection maintenance module 704 and PNNI signalling module 706. ATM section 700 may reside in a central control module of switch 108. MPLS processing section 702 comprises CV frame generator and transmitter 603 and CV/BDI/FDI monitor 608, MPLS connection control module 708, and MPLS OAM state machine 710. CV transmitter module 602 and CV/BDI/FDI monitor 608 connect to physical port 712 which connects to tunnel 218 and operate as described earlier. LSP management module 714 provides an interface for modules in the ATM processing section 700 and the MPLS processing section 702. MPLS processing section 702 may reside on a line card in switch 208. There may be several line cards in switch 108 having MPLS processing section 702.

For MPLS functionality, MPLS OAM frames are generated by CV transmitter module 602 and sent on tunnel 218. MPLS response frames are received by CV/BDI/FDI monitor 608 from tunnel 218. Thereafter, module 608 notifies OAM state machine 710 of the OAM frame. OAM state machine 710 receives the OAM frames and determines whether the associated LSP tunnel is in a CV, BDI or FDI state.

Figure 8:
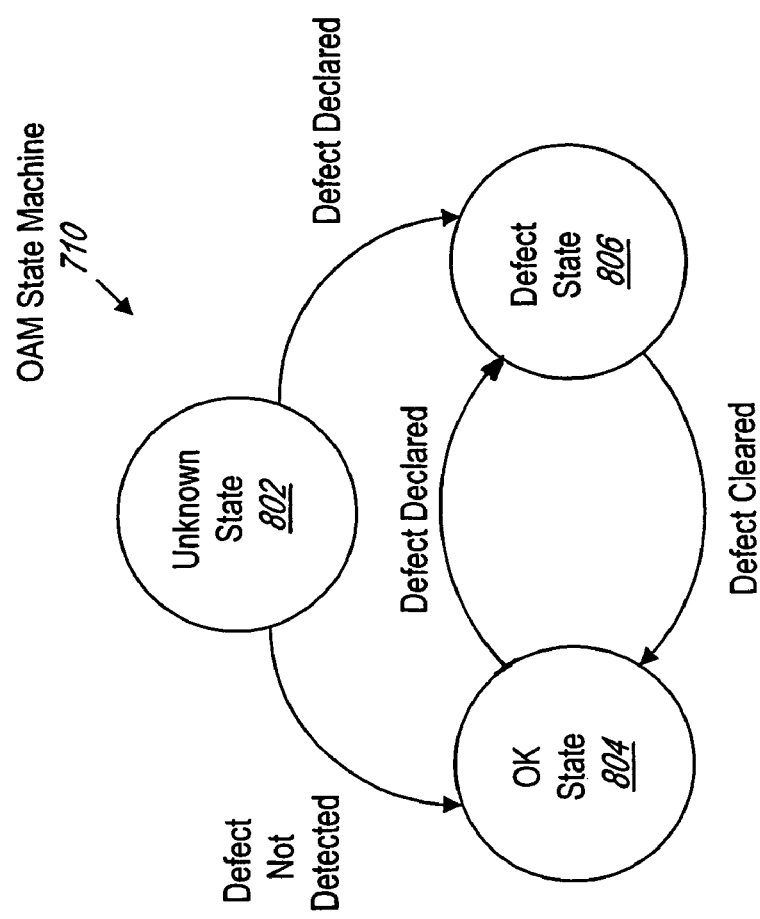
FIG. 8 is a block diagram of a MPLS OAM state machine present in the node of FIG. 7.

Referring to FIGS. 7 and 8, OAM state machine 710 has three states: Unknown state 802, OK state 804 and Defect state 806. Upon initialization, OAM state machine 710 starts in Unknown state 802.

State machine 710 will transition from Unknown state 802 to OK state 804 if connectivity verification of the tunnel is successful. Connectivity verification may be successful upon receipt of a consecutive number of CV packets. State machine 710 will transition from Unknown state 802 to Defect state 806 if connectivity verification fails or if a BDI or FDI packet is received. In performing connectivity verification, CV packets should be received by OAM state machine 710 periodically, about once every second. However, after a period of time has elapsed without receiving a CV packet, OAM state machine 710 moves to Defect state 806. In the embodiment, the LSP tunnel is in a CV failure state if CV packets are not received in a window of approximately three seconds. When initially in Unknown state 802 and state machine 710 receives either a BDI packet or an FDI, state machine 710 moves to Defect state 806.

While in Defect state 806, the defect can be cleared. If the defect was caused by an absence of a CV packet, then the defect is cleared if state machine 710 receives a series of consecutive CV packets. The number of packets may be configurable. If the defect was caused by the receipt of either a BDI or an FDI packet, then the defect may be cleared if state machine does not receive a further BDI (or FDI) packet within a defined period of time. The defined period of time may be varied by the state machine 710. Upon the clearing of a defect, state machine 710 moves to OK state 804.

In OK state 804, transitions are made to Defect state 806 upon the absence of receipt of a number of CV packets or the receipt of either a BDI or FDI packet, as described above.

Referring back to FIG. 7, when a defect has not been cleared, OAM state machine 710 signals the status of the tunnel 218 to LSP management module 714 via generating and enqueing a Change of State entry 716 of Change FIFO 718. The entry 716 contains information about the destination LSP and MPLS OAM status information, i.e. information relating to the status of the CV, BDI and FDI frames. LSP management module 714 periodically monitors FIFO 718 for new entries. Upon detection of a new entry therein, LSP management module 714 identifies which LSP failed and signals ATM signalling module 706 with a message identifying that there is a "link down" for the LSP.

ATM signalling module 706 manages ATM signal connections and process messages indicating the availability of tunnels to contain ATM connections, such as any "link down" messages from LSP management module 714.

Signalling module 706 is associated with PNNI routing module 706A and PNNI signalling module 706B. PNNI routing module 706A has access to tables and databases for all routing paths known to switch 108, including paths through network 202, which as such include paths 222 and 224. PNNI signalling module 706B manages messaging to establish and clear connections. When a "link down" message is received, routing module 706A determines an alternate path to the failed link. Once routing module 706A decides upon the alternate path, it advises signalling module 706B of the new routing change. Signalling module 706B sends a message to connection maintenance module 704 with the new signalling information. This new signalling information can be used when routing ATM traffic from CPE 210. Signalling module 706B also notifies MPLS connection control module 708 of the new PNNI information. Accordingly, signalling module 706B can signal a call from node 208 to node 212 using an ATM signalling protocol (e.g. PNNI). During this exchange, the values for second label 320 are negotiated using PNNI.

The signal received by connection control module 708 notifies it to tear down the connection for the failed tunnel and establish a new MPLS route over the alternate tunnel. For example, referring to FIG. 2, upon a failure of path 222, alternate path 224 may be selected. Routing information about the new path is also provided to MPLS connection control module 704 by PNNI routing module 706A. Routing module 706A has knowledge of all paths, including all tunnels and the status of all tunnels. MPLS connection control module 708 then determines the new label information for first label 318 and second label 320 when sending its appropriate data and CV frames out on connection 218. In connection control module 708, stack 720 comprising entries 722 of second label fields is used to track primary and alternate MPLS routing paths. The stack provides a pre-formed list of labels which can be used by connection control module 704 allowing an efficient mechanism for identifying new labels for alternate routes once it is determined that the current MPLS route is no longer viable.

It will be appreciated that the use of the MPLS CV OAM frames provides a fault resolution of signals which should be received every second by the MPLS modules in switch 208. This compares favourably with the typical PNNI signalling scheme which provides resolution of failures once every 30 seconds and ATM signalling schemes which provides resolution of information only once every 60 seconds.

Following is a description of exemplary interaction of the modules of switch 208 shown in FIG. 7 in the event of a failure in LSP 400. In Case C of FIG. 6, switch 208 stops receiving CV frames. Accordingly, OAM state machines 710 does not receive CV frames. After three consecutive missed frames i.e., three seconds, state machines 710 determines that the LSP tunnel has failed. In response, state machine 710 sends an MPLS OAM CV Failure Detected Message to LSP management modules 714.

LSP management module 714 receives the Failure Detected Message and generates and sends a "link down" message to the ATM signalling system 708.

The ATM signalling module 708 receives the "link down" message. Accordingly, each ATM connection that was previously using the failed link now cannot pass data. The ATM signalling module 708 sends a "remove connection" to MPLS connection control module 704 to remove the MPLS connection. The ATM signalling module 708 marks the current failed LSP tunnel 400 as not being available for new ATM connections.

MPLS connection control module 704 receives the "remove connection" message. It programs the CV transmitter 602 to stop forwarding-frames to the failed LSP tunnel 400 by changing the destination information in First Label Field 318 (FIG. 3).

If an alternate tunnel exists, such as tunnel 224, the ATM signalling module 708 reroutes the ATM connection across the other operational LSP tunnel. When the reroute is complete, ATM signalling module 708B sends an "add connection" message to the MPLS connection control module 704 to enable the alternate tunnel 224 to be associated with the ATM traffic.

Following is a description of possible actions taken by switch 208 when the original failure is cleared and the OAM state machine 710 begins receiving CV frames. First OAM state machine 710 sends a "CV failure cleared" message to the LSP management module 714 by enqueing an appropriate message in FIFO 718. Next, LSP management module 714 receives the "CV failure cleared" message and determines that the previously failed LSP is now operational. Accordingly it sends a "link up" message to the ATM signalling module 706B. Finally, ATM signalling module 706B receives the "link up" message. It marks the previously failed tunnel as now being available for new ATM connections. A further signal may be provided to connection control module 708 to re-use the previously failed tunnel.

It will be appreciated that from the prior art, it is not possible to use ATM OAM packets in MPLS OAM. Further, if an MPLS tunnel becomes non-operational, no ATM signalling would have been notified of the failure.

The foregoing embodiment has been described with a certain degree of particularity for the purposes of description. Those skilled in the art will understand that numerous variations and modifications may be made to the embodiments disclosed herein without departing from the scope of the invention.

We claim:

1. A method of re-establishing a connection for a communication link, the communication link having a first portion in a first communication network, a second portion in a second communication network, and an interface connecting the first portion to the second portion, the first communication network having a first communication protocol and a first operation, administration, and maintenance ("OAM") protocol adapted to monitor integrity of the first portion, the second communication network having a second communication protocol and a second OAM protocol adapted to monitor integrity of the second portion, the method comprising:

utilizing the second OAM protocol to detect a failure relating to a label switched path ("LSP") tunnel in the second portion by monitoring connectivity verification ("CV") frames of the second OAM protocol being passed over the LSP tunnel;

upon detection of the failure, identifying an alternate route for the second portion in the second communication network, the alternate route being able to complete the second portion of the communication link from the interface; and, for the communication link, at the interface replacing the second portion with the alternate route.

2. The method of claim 1 wherein the first and second communication protocols are first and second network layer protocols, respectively.

3. The method of claim 2 wherein the interface includes an adaptation function for the first and second communication networks.

4. The method of claim 3 wherein the first communication network is a source routed communication network.

5. The method of claim 4 wherein the first communication network is an asynchronous transfer mode ("ATM") communication network.

6. The method of claim 5 wherein the first OAM protocol is one of a private network-to-network interface ("PNNI") protocol and an ATM OAM protocol.

7. The method of claim 6 wherein the second communication network is a multi-protocol label switching ("MPLS") communication network.

8. The method of claim 7 wherein the second OAM protocol is a MPLS OAM protocol.

9. The method of claim 8 wherein the identifying of the alternate route for the second portion in the second communication network is performed at the interface.

10. The method of claim 9 wherein the utilizing of the second OAM protocol to detect the failure in the second portion comprises monitoring the second portion for receipt of frames containing OAM information and debouncing the frames.

11. The method of claim 10 wherein for the identifying of the alternate route for the second portion in the second communication network, a list of alternate routes for the second portion is maintained and accessed to identify the alternate route.

12. The method of claim 11 wherein the first OAM protocol is adapted to detect failures in the second portion.

13. The method of claim 10 and further comprising:

utilizing the second OAM protocol to detect clearance of the failure in the second portion; and, upon detection of the clearance of the failure, for the communication link, at the interface replacing the alternate route with the second portion.

14. A network node associated with a first communication network and a second communication network, the network node processing communications for a communication link having a first portion in the first communication network, a second portion in the second communication network, and an interface between the first portion and the second portion at the network node, the first communication network having a first communication protocol and a first operation, administration, and maintenance ("OAM") protocol adapted to monitor integrity of the first portion, the second communication network having a second communication protocol and a second OAM protocol adapted to monitor integrity of the second portion, the network node comprising:

a first module adapted to detect a failure relating to a label switched path ("LSP") tunnel in the second portion utilizing the second OAM protocol by monitoring connectivity verification ("CV") frames of the second OAM protocol being passed over the LSP tunnel;

a second module adapted to receive an indication of the failure and upon receipt of the indication, to identify an alternate route for the second portion in the second communication network, the alternate route being able to complete the second portion of the communication link from the interface; and, a third module adapted to receive an indication of the alternate route and to replace the second portion with the alternate route for the communication link.

15. The network node of claim 14 wherein the first and second communication protocols are first and second network layer protocols, respectively.

16. The network node of claim 15 wherein the interface includes an adaptation function for the first and second communication networks.

17. The network node of claim 16 wherein the first communication network is a source routed communication network.

18. The network node of claim 17 wherein the first communication network is an asynchronous transfer mode ("ATM") communication network.

19. The network node of claim 18 wherein the first OAM protocol is one of a private network-to-network interface ("PNNI") protocol and an ATM OAM protocol.

20. The network node of claim 19 wherein the second communication network is a multi-protocol label switching ("MPLS") communication network 21. The network node of claim 20 wherein the second OAM protocol is a MPLS OAM protocol.

22. The network node of claim 21 wherein the first module utilizes the second OAM protocol to detect the failure in the second portion by monitoring the second portion for receipt of frames containing OAM information and the first module debounces the frames.

23. The network node of claim 22 wherein the second module further comprises a list of alternate routes for the second portion to identify the alternate route.

24. The network node of claim 23 wherein: the first module is adapted to use the second OAM protocol to detect clearance of the failure in the second portion; and, the third module is adapted to replace the alternate route with the second portion for the communication link upon detection of the clearance of the failure.

* * * * *